G. G. Hickman,
Bolt Lock.

Nº 68,742.        Patented Sep. 10, 1867.

Witnesses:
Edward H. Knight
John C. Kemon

Inventor:
Gibbons G. Hickman
by Munn & Co
Attorneys.
Knight &c.

United States Patent Office.

GIBBONS G. HICKMAN, OF COATESVILLE, PENNSYLVANIA.

Letters Patent No. 68,742, dated September 10, 1867; antedated September 7, 1867.

IMPROVED WASHER FOR BOLT.

The Schedule referred to in these Letters Patent and making part of the same.

TO ALL WHOM IT MAY CONCERN:

Be it known that I, GIBBONS G. HICKMAN, of Coatesville, in the county of Chester, and State of Pennsylvania, have invented a new and improved Washer for Bolts; and I do hereby declare the following to be a full, clear, and exact description of the same, sufficient to enable one skilled in the art to which the invention appertains to make use of it, reference being had to the accompanying drawings, which form a part of this specification, and in which it is represented in two perspective views.

Embedded in the face of the washer is a spring, which, by engagement with the edge of the nut, prevents its becoming unscrewed until the spring is depressed. The spring may be on the upper face of the washer, against which the nut is fitted, or it may be on the lower half of a double washer, and act against the upper part, to which the nut is secured by flanges. Underneath the washer is a flange or spur, which protrudes into the object against which the washer is clamped by the nut.

Figure 1:
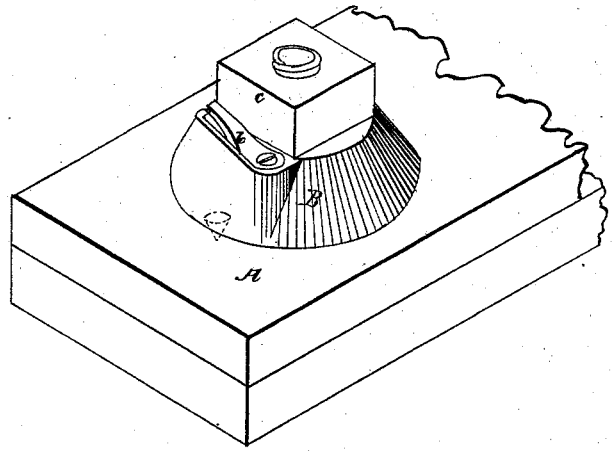
Figure 2:
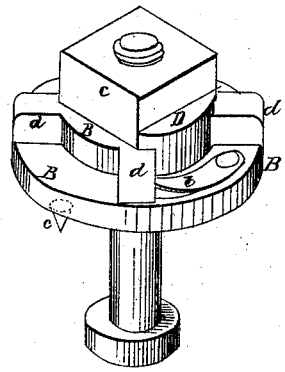

In the drawings, A is an object through which the bolts are passed, B are the washers, and C the nuts. The object of the invention is to enable the nut to be screwed up, but to prevent its accidental unscrewing by jars, occasional blows, or the common incidents which tend to loosen it. For this purpose a spring, $b$, is placed in a depression in the washer, so that its free end extends above the surface of the washer. The spring is a piece of pliable metal, and is attached in the socket of the washer by a screw, rivet, or analogous contrivance, its free end giving way to the revolution of the nut in screwing down, but opposing its edge to the unscrewing of the nut, unless it is purposely held down. It is not desired that the washer shall consist of a thin piece of metal, but it will be formed of a piece of cast or wrought metal, which will permit the spring-plate to be embedded in its outer face, so as not to offer an impediment to the rotation of the nut when screwed on firmly against the face of the washer. The stud or teat $c$, on the under side of the washer, penetrates the object A, entering a hole or indentation therein, so that it is not liable to be turned as the nut is rotated. In Figure 1 the spring is inserted in a depression in the face of the washer. In Figure 2 the washer is divided, forming, in fact, a double washer, B B', the upper and outer portion B' of which moves with the nut after the latter is depressed sufficiently to be embraced by the flange $c$, on the upper portion B' of the washer, which consists of a central circular portion, and projecting flanges $d$, between which the face of the lower half of the washer is visible. The intervals between the flanges on the portion B' admit of the operation of the spring, which rises and presents the obstacle of its raised end to the unscrewing of the flanged portion B'.

Having described my invention, what I claim therein as new, and desire to secure by Letters Patent, is—

The washer B, provided with a spring recessed in its face, and operating substantially as described.

I claim a metal washer made in two separate pieces, the lower one provided with a spring, as described, and the upper one turning with the nut, and retained by the spring, as described and represented.

To the above specification of my improved washer for bolts I have signed my hand this 26th of September, 1866.

G. G. HICKMAN.

Witnesses:
SOLON C. KEMON,
EDWARD H. KNIGHT.